United States Patent Office 3,359,177
Patented Dec. 19, 1967

3,359,177
FERMENTATION METHOD FOR THE PRODUCTION OF 5'-PURINE NUCLEOTIDES
Takashi Nara, Tokyo, Masanaru Misawa, Kawasaki-shi, and Toshio Komuro, Tokyo, Japan, assignors to Kyowa Hakko Kogyo Co., Ltd., Tokyo, Japan, a corporation of Japan
No Drawing. Filed Mar. 5, 1965, Ser. No. 437,586
Claims priority, application Japan, Mar. 9, 1964, 39/12,768, 39/12,769, 39/12,770
4 Claims. (Cl. 195—28)

ABSTRACT OF THE DISCLOSURE

5'-nucleotides are produced by culturing *Micrococcus sodonensis* or *Brevibacterium ammoniagenes* in an aqueous nutrient medium containing carbon source, nitrogen source, a growth factor, and a precursor for the nucleotide. Microorganism overgrowth at the expense of production of 5'-nucleotide is suppressed by incorporating an antibiotic or a surface acting agent in the nutrient medium.

---

This invention is concerned with the production of 5'-purine nucleotides such as 5'-inosinic acid, 5'-xanthylic acid, 5'-guanylic acid, 5'-adenylic acid and the like, on a commercially feasible—i.e., industrial—scale, by a fermentation method. The commercial feasibility is ascribable to the fact that use is made of microorganisms which have the capacity of producing the 5'-purine nucleotides from the corresponding purine bases or purine nucleosides when such microorganism is cultured in the presence of such base or nucleoside. Suitable bases are for example hypoxanthine, guanine, adenine and the like. The bases or their nucleosides may be present as such or in natural substances containing the same. The microorganisms employed are *Brevibacterium ammoniagenes*, adenine-requiring strains thereof, guanine-requiring strains thereof, *Micrococcus sodonensis*, etc.

The usefulness of *Brevibacterium ammoniagenes* microorganisms for the fermentative production of 5'-purine nucleotides is per se no part of the present invention, this utility having previously been disclosed and claimed by the present applicants. The usefulness of *Micrococcus sodonensis* for the fermentative production of 5'-purine nucleotides is however part of the present invention and is herein disclosed and claimed for the first time.

*Micrococcus sodonensis* is inter alia characterized by the property that it does not have the capacity of fermentatively producing and accumulating glutamic acid in a fermentation medium in the deficiency of biotin, and that it rather uses glutamic acid as single carbon source and as energy source. Culturing of *Micrococcus sodonensis* is effected in a culture medium having the following composition: carbohydrates or other carbon source (glucose, starch hydrolysates, glutamic acid, etc.), nitrogen source (urea, ammonium chloride, ammonium nitrate, etc.), natural substances containing nitrogen (yeast extract, peptone, meat extract, casamino acids, fish-solubles, cornsteep liquor, etc.), inorganic compounds (potassium phosphate, magnesium sulfate, calcium chloride, iron salts, etc.), biotin which the present bacterium requires in appropriate amounts. Comparatively higher concentration of potassium phosphate and magnesium sulphate (for example, 0.6%) as inorganic compounds enhances the accumulation of objective 5'-purine nucleotide.

Pantothenic acid (β-alanine, coenzyme A, etc.) and thiamine are useful as accelerating factors for the fermentation, in addition to carbon and energy sources, inorganic nitrogen source, inorganic compounds and small amounts of amino acid source. It is thus desirable to have these present in the fermentation medium.

The cultivation may also be conducted in the culture liquor of purine base or purine nucleoside fermentation as purine base source to which proper amounts of carbon source, nitrogen source, inorganic compounds, biotin and the like are added.

The fermentation is carried out at a temperature of 20° to 40° C. under an aerobic condition such as shaking culture or aerobic submerged culture. Usually after 2 to 8 day-culture remarkable amounts of 5'-purine nucleotide accumulate in the culture medium or cells of bacteria.

In a further aspect of the present invention, it is concerned with alleviating the condition which sometimes occurs in the fermentative production of 5'-purine nucleotides with the aid of *Brevibacterium ammoniagenes* or *Micrococcus sodonensis* that reduced yield of objective product is obtained because of excessive microbial growth due to the presence of unduly large amounts of growth promoting substance. This phenomenon is more likely to occur when use is made of natural substances which contain large amounts of the growth-promoting substances, such as some kinds of cornsteep liquor, rice bran, fish extract and the like in a concentration above a particular value.

According to this aspect of the invention, undesired excessive growth of bacteria, without accumulation of desired 5'-purine nucleotide, is inhibited by carrying out the fermentation according to the invention in a fermentation medium which contains added antibiotic, whereby production of the desired 5'-purine nucleotide product is enhanced. Moreover, it is useful in assuring maximal production of 5'-purine nucleotide to have such antibiotic present, even if conditions do not exist which favor excessive microbial growth.

The phenomenon that some antibiotics accelerate the formation of 5'-purine nucleotide by microorganisms provides extremely advantageous techniques for industrially producing 5'-purine nucleotide in high yield at low cost and also is biochemically an interesting fact.

Antibiotics such as penicillin, mitomycin, streptomycin, oxamycin, bacitracin, tetracyclin, hydroxytetracyclin, chlortetracyclin, carziophilin, kanamycin, neomycin and the like are employed in the invention. Mitomycin, penicillin, streptomycin and oxamycin are especially effective.

The condition of the addition of these antibiotics to the fermentation medium varies with the kinds of antibiotics, strains employed and the fermentation medium.

Generally, it is desirable to add the antibiotic at the beginning of the logarithmic growth period of the microorganism when the growth of the latter is usually excessive. Further, the accumulation of the objective product is greatly promoted by adding antibiotic at a little later period than the above in the case of normal growth of bacteria and excellent accumulation of 5'-purine nucleotide.

5'-purine nucleotide produced by use of wild strains implies 5'-inosinic acid, 5'-guanylic acid and 5'-adenylic acid corresponding to the base in the culture medium: hypoxanthine, guanine, adenine and the like or their nucleosides. Moreover, it means 5'-inosinic acid in the case of using an adenine-requiring strain and 5'-xanthylic acid in the case of a guanine-requiring strain.

In the direct fermentation method of producing 5'-inosinic acid by use of an adenine-requiring strain, excess growth of bacteria by over-addition of amino acid source, iron salt, manganese salt and the like causes the accumulation of hypoxanthine and consequently the production of 5'-inosinic acid is suppressed. However, when antibiotic is added, conversion from hypoxanthine accumulation to that of 5'-inosinic acid is realized.

Preferred microorganisms employed in this aspect of the invention are *Brevibacterium ammoniagenes* (ATCC 6871, ATCC 6872), their adenine-requiring mutant strains or their guanine-requiring mutant strains, or *Micrococcus sodonensis* No. 3765–2 (ATCC 15932).

According to still another aspect of this invention, the afore-described results which are realizable with antibiotics can also be realized—i.e., excessive growth of bacteria is suppressed and accumulation of 5'-purine nucleotide is enhanced—by the use of surface active agents in the fermentation medium in lieu of antibiotic.

As previously explained, the excessive addition of amino acid source or the addition of small amounts of elements such as manganese salt or iron salt in higher concentration above a certain value to a culture medium (containing pantothenic acid and thiamine) for the accumulation of 5'-purine nucleotide causes abnormal overgrowth of bacteria and consequently 5'-purine nucleotide is not produced. This phenomenon is especially observed when using natural substances having large amounts of the above-mentioned compounds. In the growth of microorganisms employed in this invention, a small amount of amino acid source which accelerates their growth is advantageously employed in addition to the biotin essential for their growth. As for amino acid source, it is desirable to use cheap natural substances, from the economical viewpoint of the raw material of culture medium. However some natural substances contain considerable amounts of iron salt or manganese salt, which causes over-growth of bacteria.

The addition of surface active agents when 5'-purine nucleotide is not accumulated because of excessive growth of bacteria, inhibits the growth of such bacteria and remarkably increases the accumulation of the objective product.

Furthermore the production of the objective compound is increased by adding surface active agent not only in the case of excessive bacteria growth but even when 5'-purine nucleotide is excellently accumulated, the same as in the case of the antibiotics.

The phenomenon that surface active agents can accelerate the accumulation of 5'-purine nucleotide by microorganisms also provides a very advantageous method for producing 5'-purine nucleotide industrially at low cost in high yield.

As for the surface active agents, all kinds of surface active agents with cationic, anionic, amphoteric and nonionic properties can be used in the present invention. Cationic surface active agent is most effective, the second most effective is non-onic agent, with anionic agent somewhat less effective. Naimin S–215 (polyoxyethylene alkyl-amine; manufactured by Nissan), CPC (cetylpyridinium chloride), CTAB (cetyltrimethyl ammonium bromide), Cation $F_2$–50 (alkyl-dimethyl benzyl-ammonium chloride) and the like are exemplary of the cationic surface active agents. Pronon No. 104 (manufactured by Nissan), Pronon No. 201 (manufactured by Nissan) and the like are comparatively effective non-ionic surface active agents.

The mode of addition of these surface active agents varies with the kinds of surface active agents, strains employed, the condition of the fermentation medium and so on.

Generally it is desirable to add the surface active agents comparatively late in the logarithmic growth period of the microorganisms, in the case of abnormal over-growth of the latter. For example, if maximum growth is 30 mg./ml. as the amounts of dried bacteria cells, the addition is adequate when they amount to 2/3, i.e., nearly 20 mg./ml. Further the accumulation amounts of the objective product are further increased by adding surface active agents at a later period than the above, in the case that there is no excess growth of microorganisms and the accumulation of 5'-purine nucleotide is excellent.

When wild strains are used, 5'-purine nucleotides produced are 5'-inosinic acid, 5'-guanylic acid and 5'-adenylic acid in the presence, as bases, of hypoxanthine, guanine, adenine, etc., or their nucleosides. When adenine-requiring mutant strain is employed, 5'-inosinic acid is obtained and further when guanine-requiring mutant strain is used, 5'-xanthylic acid is obtained.

In the direct fermentation method of 5'-inosinic acid by use of adenine-requiring mutant strain, hypoxanthine is accumulated and 5'-inosinic acid is scarcely produced under the condition of excessive growth of bacteria. However, when the surface active agents are added thereto, the conversion phenomenon of the fermentation from the accumulation of hypoxanthine to that of 5'-inosinic acid is realized.

The following examples set forth illustratively, but not limitatively, presently preferred embodiments of the invention.

(A) *Examples illustrating use of* Micrococcus sodonensis

EXAMPLE 1

10% (by volume) of *Micrococcus sodonensis* No. 3765–2 (ATCC 15932) cultured at 30° C. for 24 hours in an aqueous culture medium consisting of 2% of glucose, 1% of peptone, 1% of yeast extract, 0.25% of NaCl and 30 γ/l. of biotin, remainder water, is inoculated into a fermentation medium. Both culture media are pre-sterilized. An aqueous fermentation medium having the following composition is used. Aerobic shaking culture is conducted at 30° C.

Composition of the fermentation medium: 10% of glucose, 1% of yeast extract, 0.6% of $K_2HPO_4$, 0.6% of $KH_2PO_4$, 0.6% of $MgSO_4 \cdot 7H_2O$, 0.01% of $CaCl_2 \cdot 2H_2O$, 30 γ/l. of biotin, 2.5 mg./ml. of hypoxanthine (remainder water). The pH is adjusted at 8.0 with 5N–NaOH before sterilization. After sterilization, sterilized urea is added to the above-mentioned fermentation medium to constitute 0.6%. 9.9 mg./ml. of 5'-sodium inosinate are accumulated in the fermentation liquor after 96 hour-culture.

EXAMPLE 2

The same seed bacterium, seed culture medium as in Example 1 and a fermentation medium consisting of 10% of glucose, 0.6% of $K_2HPO_4$, 0.6% of $KH_2PO_4$, 0.6% of $MgSO_4 \cdot 7H_2O$, 30 γ/l. of biotin, 0.6% of urea, 0.2% of casamino acids, 10 γ/ml. of calcium pantothenate, 2 γml. of thiamine hydrochloride, 0.8% of $CaCO_3$ and 2.5 mg./ml. of hypoxanthine (remainder water) (pH 8.0 before sterilization) are employed. The other culture conditions are as in Example 1. After 120 hour-culture, 8.8 mg./ml. of 5'-sodium inosinate are produced in the fermentation liquor.

EXAMPLE 3

The same seed bacterium and seed culture medium as in Example 1 are used. The fermentation medium used in Example 1 is employed but without hypoxanthine. At the 40 hours-culture point, guanine is added in an amount of 3.0 mg./ml. The other culture conditions are the same as in Example 1. 5.8 mg./ml. of 5'-sodium guanylate are accumulated after 96 hour-culture.

EXAMPLE 4

The same seed bacterium, seed culture medium as in Example 1 and the fermentation medium employed in Example 2, but without hypoxanthine, are used. Guanine is added to constitute 2.5 mg./ml. after 72 hour-culture. The other culture conditions are the same as in Example 1. 5.1 mg./ml. of 5'-sodium guanylate are accumulated after 120 hour-culture.

EXAMPLE 5

The same seed bacterium and seed culture medium as in Example 1 and the fermentation medium of Example 3 are employed. Adenine is added to constitute 2.5 mg./ml., at the 72 hours-culture point. The other culture conditions are the same as in Example 1. 5.1 mg./ml. of 5'-sodium adenylate are accumulated after 96 hour-culture.

EXAMPLE 6

The cultivation is conducted in a fermentation medium consisting of 10% of glucose, 3% of peptone, 20 γ/ml. of adenine, 30 γ/l. of biotin, 0.05% of $K_2HPO_4$, 0.1% of $KH_2PO_4$, 0.05% of $MgSO_4 \cdot 7H_2O$ and 0.6% of urea (remainder water) using *Brevibacterium ammoniagenes* No. 7209 as a seed bacterium. By the same treatments as in Example 1, 4.9 mg./ml. of hypoxanthine are accumulated in the fermentation liquor after 72 hour-culture. The same bacterium as in Example 1 is cultured in a fermentation medium prepared by adding 8% of glucose, 0.4% of urea, 0.4% of $K_2HPO_4$, 0.4% of $KH_2PO_4$, 0.4% of $MgSO_4 \cdot 7H_2O$, 30 γ/l. of biotin, 2 γ/l. of β-alanine and 1 γ/ml. of thiamine hydrochloride into the solution obtained by removing cells of bacteria from the fermentation liquor. The other treatments are the same as in Example 1. 10.6 mg./ml. of 5'-sodium inosinate are accumulated in the fermentation liquor after 96 hour-culture.

(B) *Examples illustrating use of antibiotic*

EXAMPLE 7

*Brevibacterium ammoniagenes* (ATCC 6872) as a seed bacterium is cultured in a culture medium consisting of 2% of glucose, 1.5% of peptone, 0.2% of urea, 0.1% of $K_2HPO_4$, 0.03% of $MgSO_4 \cdot 7H_2O$, 0.3% of NaCl, 0.01% of $FeSO_4 \cdot 7H_2O$ and 30 γ/l. of biotin (remainder water) (pH 7.3) for 24 hours. Then 10% (by volume) of this seed culture medium is inoculated into a fermentation medium. Both media are sterilized beforehand. The culture is conducted at 30° C. with shaking in a fermentation medium having the following composition.

Composition of the fermentation medium: 10% of glucose, 1% of $K_2HPO_4$, 1.3% of $KH_2PO_4$, 1.1% of $MgSO_4 \cdot 7H_2O$, 0.01% of $CaCl_2 \cdot 2H_2O$, 30 γ/l. of biotin, 5 γ/ml. of calcium pantothenate, 3 γ/ml. of thiamine hydrochloride, 0.5% of cornsteep liquor, 3 mg./ml. of hypoxanthine (remainder water). The pH is adjusted at 8.0 with 5N–NaOH before sterilization. After sterilization, urea which is sterilized beforehand is added to the said culture medium to constitute 0.6%. The hereinbelow indicated amounts of mitomycin C are added in single doses at a definite period of culture. The amounts of 5'-sodium inosinate accumulated in the fermentation liquor after 96 hour-culture are shown in Table 1.

TABLE 1

| Mitomycin C added | | Accumulation amounts of 5'-sodium inosinate (mg./ml.) | Amounts of dried cells of bacteria (mg./ml.) |
|---|---|---|---|
| Addition time (hour) | Addition amounts (γ/ml.) | | |
| 8 | 15 | 1.3 | 12.9 |
|   | 30 | 2.5 | 11.0 |
| 12 | 20 | 8.82 | 15.1 |
|   | 40 | 11.03 | 14.8 |
| 16 | 20 | 3.92 | 18.0 |
|   | 40 | 4.03 | 17.6 |
| 20 | 30 | 1.22 | 21.3 |
|   | 40 | 1.11 | 20.7 |
| No addition | | Trace | 32.8 |

EXAMPLE 8

The procedure is the same as in Example 7, except that penicillin G-sodium instead of mitomycin C is added in various concentrations at various times of addition. The accumulation amounts of 5'-sodium inosinate after 120 hour-culture are shown in Table 2.

TABLE 2

| Penicillin G-sodium added | | Accumulation Amounts of 5'-sodium inosinate (mg./ml.) | Amounts of dried cells of bacteria (mg./ml.) |
|---|---|---|---|
| Addition time (hour) | Addition amounts (μ/ml.) | | |
| 8 | 5 | 2.3 | 13.3 |
|   | 10 | 4.1 | 13.0 |
| 12 | 5 | 4.0 | 15.9 |
|   | 10 | 6.3 | 15.9 |
|   | 50 | 10.2 | 14.2 |
| 18 | 10 | 9.0 | 19.1 |
|   | 50 | 7.9 | 18.3 |
| No addition | | Trace | 38.2 |

EXAMPLE 9

The same seed bacterium and fermentation medium as in Example 7, but wherein 0.0005% of $MnSO_4 \cdot 4H_2O$ is added in lieu of cornsteep liquor, are employed. Further oxamycin (cycloserine) instead of mitomycin C in Example 7 is added in various concentrations and at various time periods during the fermentation. The other culture conditions are identical to those in Example 7. After 96 hour-culture, 5'-sodium inosinate is accumulated as shown in Table 3.

TABLE 3

| Oxamycin added | | Accumulation amounts of 5'-sodium inosinate (mg./ml.) | Amounts of dried cells of bacteria (mg./ml.) |
|---|---|---|---|
| Addition time (hour) | Addition amounts (γ/ml.) | | |
| 7 | 400 | 5.3 | 13.8 |
|   | 800 | 7.2 | 12.0 |
|   | 1,600 | 9.0 | 12.2 |
| 10 | 800 | 8.1 | 14.2 |
|   | 1,600 | 10.2 | 14.0 |
|   | 2,000 | 9.9 | 13.6 |
| 13 | 800 | 6.4 | 18.2 |
|   | 1,600 | 9.2 | 17.3 |
|   | 2,000 | 6.8 | 17.5 |
| No addition | | Trace | 39.1 |

EXAMPLE 10

The same seed bacterium as in Example 7 and the fermentation medium of Example 9, but without hypoxanthine, are employed. After 48 hour-culture guanine is added to constitute 3.0 mg./ml. Dihydrostreptomycin sulfate as an antibiotic is added in varied concentrations and at various periods of time. The other culture conditions are the same as in Example 7. The accumulation amounts of 5'-sodium guanylate after 96 hour-culture are shown in Table 4.

TABLE 4

| Dihydrostreptomycin sulfate | | Accumulation amounts of 5'-sodium guanylate (mg./ml.) | Amounts of dried cells of bacteria (mg./ml.) |
|---|---|---|---|
| Addition time (hour) | Addition amounts (γ/ml.) | | |
| 8 | 5 | 1.3 | 15.2 |
|   | 10 | 2.6 | 14.9 |
|   | 50 | 2.7 | 14.1 |
| 14 | 5 | 2.3 | 19.2 |
|   | 10 | 4.4 | 18.1 |
|   | 50 | 5.1 | 18.8 |
| 20 | 5 | 1.2 | 22.5 |
|   | 10 | 1.2 | 23.0 |
|   | 50 | 2.0 | 21.6 |
| No addition | | Trace | 38.6 |

EXAMPLE 11

The same seed bacterium as in Example 7 and the fermentation medium of Example 10 are used. After 48 hour-culture 2.5 mg./ml. of adenine is added. Achromycin as an antibiotic is employed with various concentrations at various time periods of addition. The other culture conditions are the same as those in Example 1. After 96 hour-culture 5'-adenylic acid is accumulated as shown in Table 5.

TABLE 5

| Achromycin added | | Accumulation amounts of 5'-adenylic acid (mg./ml.) | Amounts of dried cells of bacteria (mg./ml.) |
|---|---|---|---|
| Addition time (hour) | Addition amounts (γ/ml.) | | |
| 8 | 1 | 1.1 | 17.1 |
|   | 2 | 2.3 | 16.8 |
| 12 | 1 | 2.1 | 18.1 |
|    | 2 | 4.1 | 15.3 |
|    | 5 | 1.9 | 14.2 |
| 17 | 1 | 0.8 | 13.1 |
|    | 2 | 3.8 | 12.9 |
|    | 5 | 2.7 | 13.0 |
| No addition | | Trace | 40.2 |

EXAMPLE 12

The same seed bacterium as in Example 7 and the fermentation medium of Example 7 wherein 0.3% of NZ-amine are added instead of cornsteep liquor and further the addition amount of hypoxanthine is 4 mg./ml., are employed. During the culture, penicillin G potassium, mitomycin C and dihydrostreptomycin sulfate with definite concentration are added at definite times respectively. The other culture conditions are the same as in Example 1. The amounts of 5'-sodium inosinate accumulated in the fermentation medium after 120 hour-culture are shown in Table 6.

TABLE 6

| Antibiotics | Antibiotics added addition time (hour) | Addition amounts | Accumulation amounts of 5'-sodium inosinate (mg./ml.) | Amounts of dried cells of bacteria (mg./ml.) |
|---|---|---|---|---|
| Penicillin G potassium | 24 | 10 μ/ml | 15.1 | 15.7 |
| Mitomycin C | 28 | 20 γ/ml | 16.0 | 16.3 |
| Dihydrostreptomycin sulfate | 30 | 50 γ/ml | 13.8 | 17.0 |
| No addition | | | 9.9 | 19.8 |

EXAMPLE 13

*Brevibacterium ammoniagenes* No. 7208 (adenine-requiring mutant strain) (ATCC 15187) as a seed bacterium and a culture medium consisting of 2% of glucose, 3% of meat extract, 0.1% of urea, 0.1% of $K_2HPO_4$, 0.03% of $MgSO_4 \cdot 2H_2O$, 0.25% of NaCl, 0.01% of $$FeSO_4 \cdot 7H_2O$$

30 γ/l. of biotin and 25 γ/ml. of adenine (remainder water) (pH 7.3) are employed.

The fermentation medium contains 10% of glucose, 0.6% of $K_2HPO_4$, 0.6% of $KH_2PO_4$, 0.7% of $$MgSO_4 \cdot 7H_2O$$

0.01% of $CaCl_2 \cdot 2H_2O$, 30 γ/l. of biotin, 50 γ/ml. of adenine, 2 γ/ml. of β-alanine, 0.5 γ/ml. of thiamine hydrochloride, 0.5% of rice bran, 0.2% of cornsteep liquor and 0.6% of urea (remainder water) (pH 8.0 before sterilization). Mitomycin C or penicillin G potassium is added in various concentrations at definite periods of time. The other culture conditions are identical to those in Example 7. The accumulation amounts of 5'-sodium inosinate and hypoxanthine after 120 hour-culture are shown in Table 7.

TABLE 7

| Antibiotics added | | | Amounts of dried cells of bacteria (mg./ml.) | Accumulation amounts of 5'-sodium inosinate (mg./ml.) | Accumulation amounts of hypoxanthine (mg./ml.) |
|---|---|---|---|---|---|
| Antibiotics | Addition time (hour) | Addition amounts | | | |
| Mitomycin C | 9 | 10 γ/ml | 12.9 | 1.2 | 0.9 |
|             |   | 20 γ/ml | 11.7 | 4.7 | 0.2 |
|             | 14 | 20 γ/ml | 15.8 | 4.9 | 0.2 |
|             |    | 30 γ/ml | 15.0 | 7.8 | Trace |
| Penicillin G potassium | 9 | 5 μ/ml | 13.8 | 2.1 | 0.6 |
|                        |   | 10 μ/ml | 11.1 | 3.8 | 0.4 |
|                        | 14 | 10 μ/ml | 20.8 | 5.0 | 0.1 |
|                        |    | 20 μ/ml | 17.9 | 6.3 | Trace |
| No addition | | | 36.7 | 0.1 | 2.6 |

EXAMPLE 14

*Brevibacterium ammoniagenes* No. 62221 (guanine-requiring mutant strain) (ATCC 15138) as a seed bacterium, the culture medium of Example 13 containing 50 γ/ml. of guanine instead of adenine and the fermentation medium of Example 13 wherein 0.6% of casamino acids in lieu of rice bran and 20 γ/ml. of guanine in place of adenine are added are employed. 800 γ/ml. of oxamycin are added after 12 hour-culture. After 96 hour-culture, 5.9 mg./ml. of 5'-sodium xanthylate are accumulated and the amounts of dried cells of bacteria are 15.1 mg./ml. On the other hand, 0.1 mg./ml. of 5'-sodium xanthylate and 29.8 mg./ml. of dried cells of bacteria are obtained without adding oxamycin.

EXAMPLE 15

*Brevibacterium ammoniagenes* ATCC 6871 as a seed bacterium and the fermentation medium of Example 10 are employed. After 50 hour-culture, guanine is added to the said medium to be 3.0 mg./ml. Kanamycin sulfate is added in varied concentration at the 10 and 15 hour-culture period respectively. The other culture conditions are the same as in Example 7. The accumulation amounts of 5'-sodium guanylate after 96 hour-culture are shown in Table 8.

TABLE 8

| Kanamycin added | | Amounts of dried cells of bacteria (mg./ml.) | Accumulation amounts of 5'-sodium guanylate (mg./ml.) |
|---|---|---|---|
| Addition time (hour) | Addition amounts (γ/ml.) | | |
| 10 | 10 | 12.0 | 0.9 |
|  | 20 | 11.5 | 2.9 |
|  | 50 | 10.1 | 1.3 |
| 15 | 10 | 14.5 | 2.0 |
|  | 20 | 13.1 | 3.9 |
|  | 50 | 13.3 | 5.2 |
| No addition | | 28.3 | Trace |

EXAMPLE 16

*Micrococcus sodonensis* No. 3765–2 (ATCC 15932) as a seed bacterium, a culture medium consisting of 2% of glucose, 0.5% of yeast extract, 1.5% of peptone and 0.25% of NaCl (remainder water) (pH 7.3) and a fermentation medium containing 10% of glucose, 0.6% of $K_2HPO_4$, 0.6% of $KH_2PO_4$, 0.6% of $MgSO_4 \cdot 7H_2O$, 0.01% of $CaCl_2 \cdot 2H_2O$, 5 γ/ml. of calcium pantothenate, 1 γ/ml. of thiamine, 30 γ/l. of biotin, 0.1% of $FeSO_4 \cdot 7H_2O$, 1% of casamino acids, 0.6% of urea and 2.5 mg./ml. of hypoxanthine (remainder water) (pH 8.0 before sterilization) are employed. The other culture conditions are the same as in Example 7. After 10 hour-culture penicillin G potassium is added in varied concentrations. The accumulation amounts of 5'-sodium inosinate after 96 hour-culture are shown in Table 9.

TABLE 9

| Penicillin G potassium addition amounts (μ/ml.) | Amounts of dried cells of bacteria (mg./ml.) | Accumulation amounts of 5'-sodium inosinate (mg./ml.) |
|---|---|---|
| 5 | 19.3 | 4.1 |
| 10 | 18.2 | 5.8 |
| 20 | 14.3 | 7.2 |
| 50 | 14.1 | 7.0 |
| No addition | 30.8 | Trace |

(C) *Examples illustrating use of surface active agent*

EXAMPLE 17

*Brevibacterium ammoniagenes* (ATCC 6872) as a seed bacterium is cultured in a culture medium containing 2% of glucose, 2% of peptone, 0.1% of urea, 0.1% of $K_2HPO_4$, 0.03% of $MgSO_4 \cdot 7H_2O$, 0.3% of NaCl, 0.01% of $FeSO_4 \cdot 7H_2O$ and 30 γ/l. of biotin (remainder water) (pH 7.3) for 24 hours. 10% (by volume) of this seed medium is inoculated into a fermentation medium. Both culture media are pre-sterilized. A fermentation medium with the following composition is employed. Aerobic culture is conducted at 30° C. with shaking.

Composition of the fermentation medium: 10% of glucose, 1% of $K_2HPO_4$, 1% of $KH_2PO_4$, 1% of $MgSO_4 \cdot 7H_2O$, 0.1% of $CaCl_2 \cdot 2H_2O$, 30 γ/l. of biotin, 5 γ/ml. of calcium pantothenate, 3 γ/ml. of thiamine hydrochloride, 0.3% of cornsteep liquor, 4 mg./ml. of hypoxanthine, remainder water. The pH is adjusted at 8.0 with 5 N-NaOH before sterilization. After sterilization, sterilized urea is added into the said fermentation medium in amount of 0.6%. Polyoxyethylene alkylamine (Naimin S–215) in various concentrations is added at the 20, 24 and 28 hour-culture points. After 120 hour-culture, the amounts of 5'-sodium inosinate accumulated in the fermentation liquor are shown in Table 10.

TABLE 10

| Naimin S-215 added | | Amounts of dried cells of bacteria (mg./ml.) | Accumulation amounts of 5'sodium inosinate (mg./ml.) |
|---|---|---|---|
| Addition time (hour) | Addition amounts (γ/ml.) | | |
| 20 | 500 | 24.3 | 7.6 |
|  | 750 | 21.2 | 9.0 |
|  | 1,000 | 19.9 | 6.3 |
| 24 | 750 | 22.0 | 10.1 |
|  | 1,000 | 21.0 | 15.9 |
|  | 1,300 | 21.0 | 13.6 |
| 28 | 750 | 23.2 | 9.8 |
|  | 1,000 | 22.0 | 12.2 |
|  | 1,300 | 21.7 | 12.0 |
| No addition | | 30.8 | Trace |

EXAMPLE 18

The same procedure is followed as in Example 17, CPC (cetyl-pyridinium chloride) in various concentrations being added at the varied addition times into the culture medium in lieu of Naimin S–215. The amounts of 5'-sodium inosinate accumulated in the fermentation liquor after 120 hour-culture are shown in Table 11.

TABLE 11

| CPC added | | Amounts of dried cells of bacteria (mg./ml.) | Accumulation amounts of 5'-sodium inosinate (mg./ml.) |
|---|---|---|---|
| Addition time (hour) | Addition amounts (γ/ml.) | | |
| 21 | 250 | 25.0 | 3.5 |
|  | 500 | 22.3 | 4.9 |
|  | 750 | 19.1 | 4.9 |
| 25 | 250 | 25.9 | 8.1 |
|  | 500 | 23.2 | 12.9 |
|  | 750 | 20.4 | 10.2 |
| 29 | 500 | 24.8 | 6.3 |
|  | 750 | 23.2 | 7.1 |
| No addition | | 32.9 | Trace |

EXAMPLE 19

The same seed bacterium as in Example 17 and the fermentation medium of Example 17 containing 0.0005% of $MnSO_4 \cdot 4H_2O$ in lieu of cornsteep liquor are employed. CTAB (cetyl-trimethylammonium bromide) is used as surface active agent. The other culture conditions are identical to those in Example 17. After 96 hour-culture, 5'-sodium inosinate is accumulated as shown in Table 12.

TABLE 12

| CTAB added | | Amounts of dried cells of bacteria (mg./ml.) | Accumulation amounts of 5'-sodium inosinate (mg./ml.) |
|---|---|---|---|
| Addition time (hour) | Addition amounts (γ/ml.) | | |
| 20 | 500 | 24.0 | 3.6 |
|  | 750 | 20.2 | 5.2 |
|  | 1,000 | 16.5 | 6.5 |
| 24 | 750 | 21.3 | 10.6 |
|  | 1,000 | 21.8 | 14.1 |
|  | 1,250 | 19.2 | 15.9 |
| 28 | 750 | 22.3 | 8.2 |
|  | 1,000 | 22.5 | 9.1 |
|  | 1,250 | 21.5 | 8.7 |
| No addition | | 34.8 | Trace |

EXAMPLE 20

The same seed bacterium as in Example 17 and the fermentation medium of Example 17 but without hypoxanthine are employed. 2.5 mg./ml. of guanine is added after 50 hour-culture. Alkyldimethyl-benzylammonium chloride (Cation $F_2$–50) is used as surface active agent in the culture. The other culture conditions are as in Example 17. The accumulation amounts of 5'-sodium guanylate after 96 hour-culture are shown in Table 13.

TABLE 13

| Cation $F_2$–50 added | | Amounts of dried cells of bacteria (mg./ml.) | Accumulation amounts of 5'-sodium guanylate (mg./ml.) |
|---|---|---|---|
| Addition time (hour) | Addition amounts ($\gamma$/ml.) | | |
| 22 | 500 | 19.5 | 1.1 |
|  | 1,000 | 17.1 | 2.0 |
| 26 | 500 | 20.3 | 1.9 |
|  | 1,000 | 19.3 | 5.9 |
|  | 1,250 | 20.1 | 4.7 |
| 30 | 500 | 21.5 | 2.3 |
|  | 1,000 | 21.3 | 4.0 |
|  | 1,250 | 22.7 | 3.1 |
| No addition |  | 36.8 | Trace |

EXAMPLE 21

The same seed bacterium as in Example 17 and the fermentation medium of Example 17 but containing 0.4% of peptone instead of cornsteep liquor are employed. Naimin S–215, CPC and Cation $F_2$–50 are added in definite concentrations and at definite times respectively. The other culture conditions are as in Example 17. After 120 hour-culture, 5'-sodium inosinate is produced as shown in Table 14.

TABLE 14

| Surface active agents added | | | Amounts of dried cells of bacteria (mg./ml.) | Accumulation amounts of 5'-sodium inosinate (mg./ml.) |
|---|---|---|---|---|
| Surface active agents | Addition time (hour) | Addition amounts ($\gamma$/ml.) | | |
| Naimin S–215 | 38 | 400 | 18.6 | 15.8 |
| CPC | 36 | 200 | 18.9 | 15.0 |
| Cation $F_2$–50 | 38 | 400 | 19.0 | 14.7 |
| No addition |  |  | 22.9 | 8.9 |

EXAMPLE 22

*Brevibacterium ammoniagenes* (ATCC 6871) as a seed bacterium and the fermentation medium of Example 17 wherein 2 mg./ml. of hypoxanthine is contained are employed. The other culture conditions are the same as in Example 17. Pronon No. 104 is used as a surface active agent. The accumulation amounts of 5'-sodium inosinate after 120 hour-culture are shown in Table 15.

TABLE 15

| Pronon No. 104 added | | Amounts of dried cells of bacteria (mg./ml.) | Accumulation amounts of 5'-sodium inosinate (mg./ml.) |
|---|---|---|---|
| Addition time (hour) | Addition amounts ($\gamma$/ml.) | | |
| 16 | 500 | 25.4 | 1.3 |
|  | 1,000 | 23.2 | 2.2 |
| 20 | 1,000 | 23.9 | 7.5 |
|  | 1,500 | 21.0 | 6.1 |
| 24 | 1,000 | 24.3 | 4.0 |
|  | 1,500 | 22.0 | 2.6 |
| No addition |  | 37.2 | Trace |

EXAMPLE 23

*Brevibacterium ammoniagenes* No. 7208 (ATCC 15187) (adenine-requiring mutant strain) as a seed bacterium and a culture medium consisting of 2% of glucose, 3% of meat extract, 0.1% of urea, 0.1% of $K_2HPO_4$, 0.03% of $MgSO_4 \cdot 7H_2O$, 0.25% of NaCl, 0.01% of $FeSO_4 \cdot 7H_2O$, 30 $\gamma$/l. of biotin and 25 $\gamma$/ml. of adenine (remainder water) (pH 7.3) are used.

The fermentation medium employed contains 10% of glucose, 0.6% of $K_2HPO_4$, 0.6% of $KH_2PO_4$, 0.7% of $MgSO_4 \cdot 7H_2O$, 0.01% of $CaCl_2 \cdot 2H_2O$, 30 $\gamma$/l. of biotin, 50 $\gamma$/ml. of adenine, 2 $\gamma$/ml. of $\beta$-alanine, 0.5 $\gamma$/ml. of thiamine hydrochloride, 0.5% of rice bran, 0.2% of cornsteep liquor and 0.6% of urea (remainder water) (pH 8.0 before sterilization). Naimin S–215 or CTAB is added in various concentrations at various times. The other culture conditions are as in Example 17. After 120 hour-culture, 5'-sodium inosinate and hypoxanthine are accumulated as shown in Table 16.

TABLE 16

| Surface active agents added | | | Amounts of dried cells of bacteria (mg./ml.) | Accumulation amounts of 5'-sodium inosinate (mg./ml.) | Accumulation amounts of hypoxanthine (mg./ml.) |
|---|---|---|---|---|---|
| Surface active agents | Addition time (hour) | Addition amounts ($\gamma$/ml.) | | | |
| Naimin S–150 | 18 | 300 | 23.0 | 1.3 | 0.8 |
|  |  | 600 | 23.1 | 2.0 | 0.7 |
|  |  | 1,000 | 18.1 | 4.9 | 0.1 |
|  | 24 | 600 | 23.5 | 3.1 | 0.1 |
|  |  | 1,000 | 21.3 | 6.9 | Trace |
|  |  | 1,200 | 20.8 | 7.3 | Trace |
| CTAB | 20 | 500 | 24.9 | 0.7 | 1.9 |
|  |  | 1,000 | 23.3 | 2.9 | 1.0 |
|  |  | 1,500 | 22.2 | 1.2 | 0.7 |
|  | 24 | 500 | 25.7 | 2.7 | 1.1 |
|  |  | 1,000 | 23.7 | 5.1 | Trace |
|  |  | 1,500 | 22.3 | 2.7 | 0.8 |
| No addition |  |  | 31.2 | 0.2 | 2.7 |

EXAMPLE 24

*Brevibacterium ammoniagenes* No. 62221 (guanine-requiring mutant strain) as a seed bacterium and the culture medium of Example 23 containing 20 $\gamma$/ml. of guanine in lieu of adenine are employed. The fermentation medium of Example 23 wherein 0.6% of casamino acids instead of rice bran and 20 $\gamma$/ml. of guanine in lieu of adenine are added is used.

After 24 hour-culture 900 $\gamma$/ml. of Cation $F_2$–50 are added. 6.1 mg./ml. of 5'-sodium xanthylate are accumulated in 120 hours-culture and 21.7 mg./ml. as the amounts of dried cells of bacteria. On the other hand when Cation $F_2$–50 is not added, the accumulation amounts of 5'-sodium xanthylate are trace and 28.7 mg./ml. as the amounts of dried cells of bacteria.

EXAMPLE 25

*Micrococcus sodonensis* No. 3765-2 (ATCC 15932) as a seed bacterium, a culture medium consisting of 2% of glucose, 0.5% of yeast extract, 1.5% of peptone and 0.25% of NaCl (remainder water) (pH 7.3) and a fermentation medium containing 10% of glucose, 0.6% of $K_2HPO_4$, 0.6% of $KH_2PO_4$, 0.6% of $MgSO_4 \cdot 7H_2O$, 0.01% of $CaCl_2 \cdot 2H_2O$, 5 γ/ml. of calcium pantothenate, 1 γ/ml. of thiamine, 30 γ/l. of biotin, 0.1% of $FeSO_4 \cdot 7H_2O$, 1% of casamino acids and 0.6% of urea (remainder water) (pH 8.0 before sterilization) are employed. 20 mg./ml. of adenine is added after 48 hour-culture and further Naimin S–215 is added in varied concentrations after 30 hour-culture. The other culture conditions are the same as in Example 17. After 96 hour-culture 5′-sodium adenylate is accumulated as shown in Table 17.

TABLE 17

| Naimin S-215 addition amounts (γ/ml.) | Amounts of dried cells of bacteria (mg./ml.) | Accumulation amounts of 5′-sodium adenylate (mg./ml.) |
|---|---|---|
| 500 | 24.9 | 1.08 |
| 750 | 22.1 | 3.93 |
| 1,000 | 20.4 | 4.08 |
| 1,250 | 18.2 | 2.99 |
| No addition | 29.3 | Trace |

EXAMPLE 26

The same seed bacterium and culture medium as in Example 25 are employed. However 2.0 mg./ml. of guanine is added instead of adenine into the said medium after 48 hour-culture. Further CPC is added in varied concentrations after 30 hour-culture. The other culture conditions are identical to those in Example 17. The accumulation amounts of 5′-sodium guanylate after 96 hour-culture are shown in Table 18.

TABLE 18

| CPC addition amounts (γ/ml.) | Amounts of dried cells of bacteria (mg./ml.) | Accumulation amounts of 5′-sodium guanylate (mg./ml.) |
|---|---|---|
| 250 | 22.8 | 2.1 |
| 500 | 22.0 | 4.3 |
| 750 | 20.1 | 4.7 |
| 1,000 | 19.6 | 1.8 |
| No addition | 28.7 | Trace |

In the foregoing examples:

mg./ml.=milligrams per milliliter
γ/l.=gamma per liter
γ/ml.=gamma per milliliter
percentages are by weight.

The amounts of purine nucleotides are shown as IMP. $2Na \cdot 7\frac{1}{2} H_2O$, GMP. 2Na, AMP, and XMP.

What is claimed is:

1. A method for producing 5′-nucleotide which comprises culturing *Micrococcus sodonensis* in an aqueous nutrient medium containing carbon source, nitrogen source and, as a precursor of said nucleotide, a purine base corresponding to the said 5′-nucleotide, until the latter has accumulated.

2. A method according to claim 1, wherein the said precursor is purine nucleoside.

3. In a method for producing 5′-nucleotide by culturing a microorganism selected from the group consisting of *Micrococcus sodonensis* and *Brevibacterium ammoniagenes* in an aqueous nutrient medium containing nutrients, growth factors, and a precursor for said nucleotide, the improvement which comprises incorporating into said nutrient medium an effective amount of a microorganism growth-suppressing antibiotic selected from the group consisting of penicillin, mitomycin, streptomycin, oxamycin, bacitracin, tetracyclin, hydroxytetracyclin, chlortetracyclin, carziophilin, kanamycin, and neomycin.

4. In a method for producing 5′-nucleotide by culturing a microorganism selected from the group consisting of *Micrococcus sodonensis* and *Brevibacterium ammoniagenes* in an aqueous nutrient medium containing nutrients, growth factors, and precursors for said nucleotide, the improvement which comprises incorporating into said nutrient medium an effective amount of microorganism growth-suppressing surface active agent selected from the group consisting of cationic and nonionic surface active agents.

References Cited

UNITED STATES PATENTS 3,152,966   10/1964   Kinoshita et al. _____ 195—28
3,211,629   10/1965   Abe et al. _____ 195—28

OTHER REFERENCES

Hanka: Journal of Bacteriology, vol. 80, pp. 30 to 36, July, 1960.

ALVIN E. TANENHOLTZ, *Primary Examiner.*

UNITED STATES PATENT OFFICE
CERTIFICATE OF CORRECTION

Patent No. 3,359,177 December 19, 1967

Takashi Nara et al.

It is hereby certified that error appears in the above numbered patent requiring correction and that the said Letters Patent should read as corrected below.

Column 3, line 52, for "non-onic" read -- non-ionic --; column 6, TABLE 4, fourth column, line 10 thereof, for "38.6" read -- 38.9 --; column 10, TABLE 12, fourth column, line 5 thereof, for "14.1" read -- 14.9 --; same table, fourth column, line 6 thereof, for "15.9" read -- 15.1 --.

Signed and sealed this 11th day of February 1969.

(SEAL)
Attest:

Edward M. Fletcher, Jr.
Attesting Officer

EDWARD J. BRENNER
Commissioner of Patents